| United States Patent [19] | [11] 3,947,482 |
|---|---|
| Albers et al. | [45] Mar. 30, 1976 |

[54] METHOD FOR PRODUCING OPEN FRAMEWORK ZEOLITES

[75] Inventors: Edwin W. Albers, Annapolis; David E. W. Vaughan, Ellicott City, both of Md.

[73] Assignee: W. R. Grace & Co., Columbia, Md.

[22] Filed: Mar. 20, 1974

[21] Appl. No.: 452,734

[52] U.S. Cl. .............................. 260/448 C; 423/329
[51] Int. Cl.$^2$ ......................................... C01B 33/28
[58] Field of Search .................. 423/328, 329, 330; 260/448 C; 252/455 Z

[56] References Cited
UNITED STATES PATENTS

| 3,247,195 | 4/1966  | Kerr ................................. 423/329 X |
| 3,306,922 | 2/1967  | Barrer et al. ..................... 260/448 C |
| 3,314,752 | 4/1967  | Kerr .................................... 423/328 |
| 3,355,246 | 11/1967 | Kuehl ................................. 423/328 |
| 3,578,398 | 5/1971  | Jenkins .............................. 423/328 |
| 3,702,886 | 11/1972 | Argauer et al. ..................... 423/328 |
| 3,808,326 | 4/1974  | McDaniel et al. ................... 423/329 |

*Primary Examiner*—Edward J. Meros
*Attorney, Agent, or Firm*—Kenneth E. Prince; Arthur P. Savage

[57] ABSTRACT

High purity synthetic zeolites having open frameworks, such as offretite, uncontaminated with detectable traces of other zeolites, can be synthesized by the hydrothermal reaction of a silica source, alumina source, sodium hydroxide and/or potassium hydroxide in the presence of a zeolite nucleation slurry synthesized from a mixture of a silica source, alumina source, sodium hydroxide and/or potassium hydroxide and an organic template agent. The preferred organic template agents are the quaternary compounds wherein the central element is one from Group 5A of the Periodic Table and various conjugated aromatic compounds. The zeolite synthesis mixture itself does not contain any organic ion template agent. With this organic template agent not being required, the nucleation slurry is used to promote crystallization of the synthesis mixture to the open framework type of zeolite.

8 Claims, No Drawings

METHOD FOR PRODUCING OPEN FRAMEWORK ZEOLITES

This invention relates to a new method for producing high purity synthetic open framework zeolites such as offretite. In a particular embodiment this invention relates to a method of producing a synthetic offretite which is not contaminated with any detectable traces of other zeolites by a rapid crystallization technique. It is also a particular embodiment of this invention that these zeolites can be synthesized without the requirement of high contents of organic template agent in the synthesis slurry.

The term "organic template agent" as used in this application applies to a compound which in the synthesis of a zeolite supplies a cation which functions as a template around which the zeolite structure forms. That is, it functions as a mold around which the zeolite structure can grow. When these open framework zeolites are being synthesized, it has been found that a compound having molecular dimensions similar to that of the internal structure of the zeolite is essential. Thus, by the use of compounds having various molecular dimensions, various open framework zeolites can be produced.

Offretite is an open framework zeolite which has been known to exist in nature since about 1900. Other naturally occurring open framework zeolites include erionite, mordenite, ferrierite, gmelenite, levynite and phillipsite.

Synthetic open framework zeolites include those which have been designated as zeolite L, zeolite S, zeolite omega, zeolite ZK-4, zeolite ZSM-5, zeolite ZSM-8, zeolite ZSM-4, zeolite ZSM-11, zeolite rho and zeolite alpha. The synthesis of these open framework type zeolites requires the presence of an organic template agent in order for this novel framework to form. That is, up until this time it has been considered that these zeolites could not be effectively synthesized in a high purity without the use of the various costly organic reagents. It has now, however, been known that these zeolites can be synthesized from a reaction admixture by the hydrothermal reaction of a solution mixture which contains an alumina source, a silica source, sodium hydroxide and optionally potassium hydroxide. That is, these are the only components required when a synthesis nucleation slurry is also used in the reaction admixture. The synthesis nucleation slurry is composed of an aged admixture of an alumina source, a silica source, sodium hydroxide, optionally potassium hydroxide and an organic template agent. This nucleation slurry mixture, when present in an amount of about 1 percent to about 10 percent by weight of the synthesis mixture, is sufficient to cause the synthesis mixture to crystallize into an open framework zeolite structure. The advantage here is that only small amounts of the costly organic template agent need be utilized.

The nucleation slurry is in essence a synthesis slurry which after aging could be crystallized to the same zeolite which is used to induce crystallization. That is, a synthesis slurry which contains an organic template agent in order to form a particular open framework zeolite can be taken after the aging step, i.e., prior to crystallization, and added to a similar synthesis slurry which omits the organic template agent, and this large mixture can be converted to the open framework zeolite. The prime discovery therefore is that an aged synthesis slurry which contains the organic template agent which forms and maintains the open spaces until the framework sets to a crystal structure, can be used to induce the formation of that zeolite from a synthesis slurry which does not contain any organic template agent. Somehow the aged nucleation slurry induces crystallization of the synthesis slurry to the same open framework organic to which the aged nucleation slurry could be crystallized. However, without the use of the nucleation slurry or an orgaanic template agent, the synthesis slurry could not on its own be crystallized to that zeolite. The template ion containing nucleation slurry therefore catalyzes, seeds or otherwise directs the physical process of crystallization in a specific direction.

The method of synthesizing the open framework zeolites yields many commercial advantages. One advantage, as has been discussed, is that a significantly decreased amount of the organic template agent can be used. A second advantage is that the open framework zeolite forms more rapidly during the crystallization step. Another advantage is that the zeolite is synthesized in a higher purity.

It is therefore a prime object of this invention to set out a technique for rapidly crystallizing open framework zeolite structures by a crystal nucleation technique. It is also a prime object of this invention to set out a novel process whereby open framework zeolites can be synthesized in high purity without the requirement of large amounts of organic template agents in the zeolite synthesis slurry mixture.

The nucleation mixture is essentially the synthesis slurry reaction mixture along with the organic template compound. The procedure for synthesis of the particular zeolite is to age the nucleation mixture, and then add this aged nucleation mixture in an amount of about 1 to 50 percent by weight to the slurry synthesis mixture. The combined mixture is then aged for a period of about 5 to 100 hours at 60° C to 150° C whereby the open framework structure forms and crystallizes. The zeolite slurry is then washed by any conventional technique until the wash medium is substantially free of cations, dried by heating to a temperature of more than 100° C.

It is not known exactly what is happening in this process sequence; however it can be theorized that the nucleation mixture contains nuclei of the particular open framework zeolite and induces like formation in the slurry synthesis mixture. It was surprising, however, to find that when such a nucleation slurry mixture is used that the organic template agent need not be used in the slurry reaction mixture. This was unexpected since to form these open framework zeolites it is considered that there must be some ion, usually a cation, present to maintain the open structure up to and through the time of crystallization of the aluminosilicate to its rigid crystalline zeolite framework. That is, there must be some ion present around which this open framework type of structure forms in order to maintain this type of structure through crystallization.

The organic template compounds which are useful in producing the nucleation mixtures are quaternary compounds of group 5A elements, such as nitrogen, phosphorus and various complex organic ring compounds. These compounds yield template cations in aqueous mixtures. The quaternary compounds are generally expressed by the following formula:

$R_4M^+A^-$ wherein M is an element of group 5A of the Periodic Table, R is an alkyl or aryl group containing 1 to 7 carbon atoms and $A^-$ is the compound balancing anion. Although normally each alkyl or aryl group will be the same, it is not necessary that each group be the same type or have the same number of carbon atoms in the chain. The quaternary compounds which are preferably used as the template ion materials are those such as tetramethyl, tetraethyl, tetrapropyl, tetrabutyl, benzyltrimethyl, neopentyltrimethyl or benzyltriphenyl, ammonium, phosphonium, or arsenium sulfate, hydroxide, chloride nitrate, phosphate or other compound balancing anion. The preferred quaternary cations are tetramethylammonium, tetraethylammonium, tetrapropylammonium, tetrabutylammonium, benzyltrimethylammonium, neopentyltrimethylammonium, tetrabutylphosphonium and benzyltrimethylphosphonium. The complex organic ring compounds which have been found useful as templates are 1-methyl-1,4 diazoniacyclo(2.2.2) octane, 5-azonia-spiro(4.4) nonane, also known as bisprrolidinium, and 6-azoniaspiro (4.5) decane.

Obviously there will be some organic template ion present in the resulting synthesized zeolite. These organic template ions are those which are derived from the zeolite nucleation slurry. These are associated with a small portion of the anionic sites in the offretite structure. The organic template ions can be removed either by ion exchanging them from the crystalline lattice structure or, preferably, they can be removed in a calcination step during which the organic portions are decomposed and exit the zeolite as carbon and other oxidation products. In most instances, since the content of organic template ion is so low, there need not be a separate step for their removal. The resulting product after calcination is a synthetic zeolite having a silica to alumina ratio in the range of about 2 to 15. Any alkali ions such as sodium ions and potassium ions remaining in the zeolite structure can be exchanged with ammonium ions, additional sodium or potassium ions or metal ions in groups IIA, VA, IB to VIII B and Group VIII of the Periodic Chart of the Elements. The mode of exchange can be by any known technique. A very useful method of exchange is to contact the zeolite with an aqueous solution which contains the desired ions to be exchanged into the zeolite structure with or without heating in one or more contacting operations. When multiple contacting steps are used there may also be an intermediate heat treating of the partially exchanged offretite between the various contacting steps.

The synthetic zeolite products produced by this process have been analyzed using x-ray diffraction and an analysis of the adsorption capacity for various gaseous and liquid substances. The Guinier photographic x-ray diffraction technique is the most sensitive since it is a direct comparison with the materials which are present or could be present in the material being analyzed. That is, the sample which is being alalyzed is being contacted with x-rays as well as samples of materials which are known or thought to be present. In these analyses no x-ray diffraction lines of zeolites other than that being synthesized showed up in the photographs. In the specific synthesis of offretite, only the diffraction lines of offretite were in the photograph. If there were even low contents of other zeolites present in the synthesized offretite, this would be detectable using the Guinier photographic x-ray diffraction technique.

In general the nucleation slurry mixture for promoting the crystallization of the open framework zeolites has a composition in the range of:

2–8 $Z_2O$: $Al_2O_3$: 2–20 $SiO_2$: 120–400 $H_2O$ wherein $Z_2O$ is a mixture containing $Na_2O$, $R_2O$ and optionally $K_2O$, R being an organic molecule. The alumina component may be sodium aluminate, aluminum sulfate, potassium aluminate, alumina or a mixture of these alumina sources. The silica component may be sodium silicate, an amorphous silica such as precipitated silica or a silica gel, potassium silicate or a mixture of these silica sources. The sodium oxide component is supplied by means of sodium hydroxide and the sodium component of sodium silicate and sodium aluminate. When potassium oxide is present this is usually added as potassium hydroxide. When this slurry has been aged it is in a condition to promote crystallization of a synthesis slurry even though the nucleation slurry itself has no detectable crystallinity. The synthesis slurry will have the same composition of components except minus the organic template ion. That is, the synthesis slurry will have the general composition:

2–8 $A_2O$: $Al_2O_3$: 2–20 $SiO_2$: 120–400 $H_2O$ wherein $A_2O$ is $Na_2O$ and optionally $K_2O$. The alumina and silica components are supplied by the same sources as for the nucleation slurry. The amount of nucleation slurry added to the synthesis slurry may be in the range of about 1 to 50 percent by volume or more. Preferably the amount added is in the range of 2 to 20 percent by volume.

The following more detailed description of the invention will be discussed in relation to the synthesis of offretite which is exemplary of the open framework zeolites. However, the same procedure would apply to the synthesis of other open framework zeolite structures. In order to synthesize other open framework zeolite structures there need only be an adjustment of the reaction components in the zeolite nucleation slurry mixture and in the zeolite synthesis slurry mixture effective to produce that zeolite. That is, the zeolite nucleation slurry mixture is adjusted so that on aging there will be nuclei of the desired zeolite formed in the slurry. The offretite zeolite nucleation slurry mixture in this instance is formed from a silica source, an alumina source, $Na_2O$ source, $K_2O$ source and a Group 5A organic quaternary ion blocking agent source. The nucleation slurry has a component admixture molecular formula as follows:

2–8 $Z_2O$: $Al_2O_3$: 7–18 $SiO_2$: 140–250 $H_2O$ wherein $Z_2O$ is a mixture of about 2 to 5, $Na_2O$, 0.4 to 4, $K_2O$ and 0.3 to 3 of an organic template ion $(R_4M)_2O$. This admixture is then aged at from about 0° C to about 120° C for from 12 to 300 hours whereby nuclei form in the admixture. When this nucleation admixture is added to an offretite synthesis slurry which has essentially the following molecular composition:

2–8 $A_2O$: $Al_2O_3$: 7–18 $SiO_2$: 140–250 $H_2O$ wherein $A_2O$ is a mixture of about 2 to 5, $Na_2O$ and 0.4 to 4; $K_2O$, and this resulting mixture is heated at about 60° C to 150° C for from 5 to 40 hours, an offretite containing no detectable amounts of other zeolite contaminants is produced. The nucleation slurry mixture which is added has the effect of causing the synthesis admixture which in itself does not contain any organic template agent to convert to an offretite zeolite. The overall quantity of organic agent used is thereby kept to a minimum since preferably about 1 to 20 percent by weight of the nucleation slurry is used in producing the zeolite. This translates into a decreased use of 80 to 99 percent of the organic template ion. This is a significant decrease considering that the organic template compounds are the most costly ingredients.

The open framework zeolite offretite is advantageously formed from a synthesis slurry having a component molar ratio of 1.6 $Na_2O$: 2.0 $K_2O$: $Al_2O_3$: 10.0 $SiO_2$: 160 $H_2O$.

The analysis of the synthetic offretite minerals in regard to their adsorption capacity for large organic molecules showed them to have the capacity of a pure mineral offretite. These synthetic offretite materials exhibited a good capacity for benzene, paraxylene and metaxylenes, without the heretofore requirement of burning out the template ion.

The following examples are set out to further illustrate the invention.

EXAMPLE 1

This example illustrates the advantages of this synthesis method by contrasting the products formed using this ion synthesis concept and products formed by the conventional methods.

A nucleation slurry (Slurry A) was prepared by dissolving 18 gm. KOH and 37 gm. NaOH in 400 gm. $H_2O$, adding 35 gm. tetramethylammonium chloride (TMA Cl) and heating until all the salts dissolved. 31 gm. of alumina tri-hydrate were then added to this solution, and the mixture heated at 90° C until the alumina dissolved; this solution was then cooled to room temperature. 400 gm. of a colloidal silica (30 percent $SiO_2$) were then added to a blender, and the alumina solution was slowly added with vigorous agitation and blended for 5 minutes. A second slurry (slurry B) was then prepared in the same manner as slurry A, but excluding the addition of the template compound (TMACl).

i. A 500 gm. sample of slurry A was hot-aged in a stirred kettle at 100° C. After 50 hours offretite started to form in the slurry and after 72 hours the offretite x-ray pattern achieved a maximum value but showed a minor amount of erionite. After washing this sample and calcining for 1 hour at 1000° F, the offretite had a nitrogen surface area of 400 m²/gm.

ii. A 500 gm. sample of slurry A was cold-aged at room temperature for 3 days, then 5 percent of this aged slurry were added 95 percent of a freshly prepared slurry A. The mixture was then hot-aged at 95° C and stirred constantly. Offretite was observed after 30 hours, and the offretite yield reached a maximum value after 60 hours. When this sample was washed and calcined at 1000° F for 1 hour the product had a nitrogen surface area of 400 m²/gm. There was no discernible amount of erionite present.

iii. A 500 gm. sample of slurry A was aged at room temperature for 3 days, the 5 vol. percent of this aged slurry were added to 95 vol. percent of a freshly made slurry B. The mixture was then hot-aged at 95° C with stirring. After 25 hours the offretite started to appear in quantity and reached a maximum after 29 hours, with no discernible impurity. After washing and calcining this product had a surface area of 520 m²/gm.

The procedure (iii) is the most efficient for producing high purity offretite. Slurry A nucleates slurry B and directs the comparatively rapid crystallization of slurry B to offretite.

EXAMPLE 2

This example illustrates the formation of zeolite ZK-4. This zeolite is crystallized from the following precursor mixture:

3.4 $TMA_2O$: 1.46 $Na_2O$: $Al_2O_3$: 3.9 $SiO_2$: 350 $H_2O$

A sodium aluminate solution is formed by dissolving 13.5 g. of alumina tri-hydrate in a solution of 10.2 g. sodium hydroxide in 33 g. of water maintained at about 80° C. This solution was then cooled, followed by the addition of 20 g. of water and reheated to boiling. This solution is designated Solution A.

A second solution (Solution B) is formed by dissolving 20.2 g. of silica powder in 535 g. of 10 percent tetramethylammonium (TMA) hydroxide. Solution B was poured into a high speed mixer, and Solution A was slowly added. The mixture of these solutions (Solution A-B) was hot aged in sealed containers in an oven at 105° C for 24 hours. The resulting mixture was suction filtered, washed with water and dried in an oven at 110°–120° C. This zeolite product has the diffraction patter of ZK-4, and a surface area of 460 m²/g. after calcining at 1000° F for 3 hours.

This is the conventional synthesis technique for ZK-4. The improved process of this invention is as follows:

A solution having the composition of:

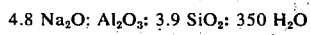
4.8 $Na_2O$: $Al_2O_3$: 3.9 $SiO_2$: 350 $H_2O$ was formed by dissolving 10.8 g. of alumina tri-hydrate in a hot solution of 26.9 g. of sodium hydroxide in 50 g. of water. This was then rapidly with vigorous mixing to a slurry of 16.3 g. of amorphous silica in 300 g. of water. This is designated as Mixture C.

A portion of the above Solution A-B was aged at 25° C for 72 hours. A volume of Solution A-B equivalent to 10 percent by volume of Mixture C was added to Mixture C with mixing, and the combination aged in a closed vessel at 105° C for 15 hours. The product was suction filtered, water washed and dried in an oven at 110° C. The product had the x-ray diffraction pattern of ZK-4 and after activation at 800° F for 1 hour, a surface area of 470 m²/g.

EXAMPLE 3

The procedure of Example 2 was repeated except that 5 percent by volume of Solution A-B was added to Mixture C. After being aged for 15 hours at 105° C the product was suction filtered, water washed and dried at 110° C to 120° C. The zeolite product has the x-ray diffraction pattern of ZK-4, and after activation at 800° F for 1 hour a surface area of 430 m²/g.

This example illustrates that the amount of organic template ion necessary to form these open framework zeolites can be decreased considerably when the nucleation technique is used. The nucleated slurry composition in Example 2 had a composition:

0.3 (TMA)$_2$O: 4.7 Na$_2$O: Al$_2$O$_3$: 3.9 SiO$_2$: 350 H$_2$O

The nucleated slurry composition in Example 3 had the composition:

0.16 (TMA)$_2$O: 4.7 Na$_2$O: Al$_2$O$_3$: 3.9 SiO$_2$: 350 H$_2$O

In comparison, the conventional process requires a composition of:

3.4 (TMA)$_2$O: 1.46 Na$_2$O$_3$: Al$_2$O$_3$: 3.9 SiO$_2$: 350 H$_2$O

Only 5 to 10 percent of the organic template compound need be used when the present nucleating method is used. In a cost comparison sodium hydroxide is considerably less costly than the organic compounds. Further, the nucleating process requires less in-line process time. The cold aging of Solution A-B is not in-line, and thus is not a process rate affecting factor. On the average, 10 hours can be saved using the nucleating process.

After washing the zeolite is dried by heating to above 100° C, preferably to about 110° C to 150° C. The zeolite may then be activated by heating at temperatures of about 150° C to 800° C.

What is claimed is:

1. A method of synthesizing zeolites having an open framework and requiring organic template ions comprising:
    forming a first aqueous mixture of a silica source, alumina source and alkali metal hydroxide in a mole ratio of:

2–8 A$_2$O: Al$_2$O$_3$: 2–20 SiO$_2$: 120–400 H$_2$O, wherein A$_2$O is alkali metal oxide;
    forming a second aqueous mixture of a silica source, alumina source, alkali metal hydroxide and an organic template compound in a mole ratio of 2–8 Z$_2$O: Al$_2$O$_3$: 2–20 SiO$_2$: 120–400 H$_2$O, wherein Z$_2$O is a mixture of alkali metal oxide and organic template ion;
    aging said second aqueous mixture for 12 to 300 hours at about 0° C to 120° C;
    adding a portion of said second aged aqueous mixture to said first aqueous mixture and maintaining the resulting mixture at about 60° C to 150° C for about 5 to 100 hours; and
    separating said open framework zeolite from the aqueous mixture.

2. A method as in claim 1 wherein said second aqueous mixture comprises about 1 to 20 percent by weight of said resulting mixture.

3. A method as in claim 2 wherein said silica source is selected from the group consisting of amorphous silicas, sodium silicate, potassium silicate and mixtures thereof, and said alumina source is selected from the group consisting of alumina, sodium aluminate, potassium aluminate and mixtures thereof.

4. A method as in claim 3 wherein said silica source is sodium silicate and said alumina source is selected from the group consisting of alumina or aluminum hydroxide.

5. A method as in claim 2 wherein said first aqueous mixture has a component ratio of:

1.6 Na$_2$O: 2.0 K$_2$O: Al$_2$O$_3$: 10.0 SiO$_2$: 160 H$_2$O and wherein said open framework zeolite is offretite.

6. A method as in claim 3 wherein said organic template ion is a Group 5A quaternary compound having the formula:

$(R_4M)^+A^-$ wherein R is hydrocarbon radical containing 1 to 7 carbon atoms, M is selected from the group consisting of phosphorous and nitrogen and A$^-$ is an anion selected from the group consisting of hydroxide, chloride, sulfate, nitrate or phosphate.

7. A method as in claim 6 wherein said organic molecule R is selected from the molecule group consisting of tetramethylammonium, tetraethylammonium, tetrapropylammonium, tetrabutylammonium, benzyltrimethylammonium, neopentyltrimethylammonium, tetrabutylphosphonium, benzyltrimethylphosphonium, 1-methyl-1,4 diazoniacyclo (2.2.2) octane, 5-azonia-spiro (4.4) nonane and 6-azonia-spiro (4.5) decane.

8. A method as in claim 6 wherein said organic molecule R is tetramethylammonium.

* * * * *